(12) United States Patent
Whyte

(10) Patent No.: US 8,718,283 B2
(45) Date of Patent: May 6, 2014

(54) SYSTEM AND METHOD FOR PROCESSING A SHARED SECRET

(75) Inventor: William Whyte, Somerville, MA (US)

(73) Assignee: Verizon Ireland Limited, Dublin (IE)

(*) Notice: Subject to any disclaimer, the term of this patent is extended or adjusted under 35 U.S.C. 154(b) by 1982 days.

(21) Appl. No.: 10/474,980

(22) PCT Filed: Apr. 18, 2002

(86) PCT No.: PCT/IE02/00050
§ 371 (c)(1),
(2), (4) Date: Oct. 16, 2003

(87) PCT Pub. No.: WO02/088912
PCT Pub. Date: Nov. 7, 2002

(65) Prior Publication Data
US 2004/0117649 A1    Jun. 17, 2004

(30) Foreign Application Priority Data
Apr. 27, 2001    (IE) ................................ S2001/0423

(51) Int. Cl.
*G06F 21/00* (2013.01)
(52) U.S. Cl.
USPC .......................................... 380/286; 380/287
(58) Field of Classification Search
None
See application file for complete search history.

(56) References Cited

U.S. PATENT DOCUMENTS

| | | | |
|---|---|---|---|
| 5,315,658 A | 5/1994 | Micali | 380/30 |
| 5,485,474 A | 1/1996 | Rabin | 371/37.1 |
| 5,495,532 A | 2/1996 | Kilian et al. | 380/30 |
| 5,553,145 A | 9/1996 | Micali | 380/30 |
| 5,625,692 A * | 4/1997 | Herzberg et al. | 380/286 |
| 5,629,982 A | 5/1997 | Micali | 380/30 |
| 5,666,414 A | 9/1997 | Micali | 380/21 |
| 5,666,420 A | 9/1997 | Micali | 380/30 |
| 5,675,649 A * | 10/1997 | Brennan et al. | 380/286 |
| 5,708,714 A | 1/1998 | Lopez et al. | 380/25 |
| 5,764,767 A | 6/1998 | Beimel et al. | 380/21 |
| 5,768,388 A | 6/1998 | Goldwasser et al. | 380/30 |
| 5,812,670 A | 9/1998 | Micali | 380/25 |

(Continued)

FOREIGN PATENT DOCUMENTS

EP      0723348      7/1996

OTHER PUBLICATIONS

Blakley, "Safeguarding cryptographic keys," Proceedings of the AFIPS 1979 national computer conference, AFIPS, 1979, pp. 313-317.*

(Continued)

*Primary Examiner* — Benjamin Lanier

(57) ABSTRACT

A method of constructing shares in a secret is disclosed. The method operates in a network comprising a number of computing devices, each arranged to securely store at least one share in the secret k for which n shares are required to reconstruct the secret and to which access to a number m of the shares can be reliably provided at any given time. The method comprises the steps of: determining n shares for an n-of-n secret sharing scheme, each share comprising a value y; storing at least some of the shares in the computing devices such that at least m of the n shares are reliably accessible; determining the shared secret k according to the shares y; determining a further (n-m) shares consistent with the shared secret k and the shares y; and storing the additional shares in a reliably accessible location.

10 Claims, 4 Drawing Sheets

(56) References Cited

U.S. PATENT DOCUMENTS

| | | | | |
|---|---|---|---|---|
| 5,825,880 | A | 10/1998 | Sudia et al. | 380/21 |
| 5,867,578 | A | 2/1999 | Brickell et al. | 380/23 |
| 5,903,649 | A | 5/1999 | Schwenk | 380/20 |
| 5,991,414 | A | 11/1999 | Garay et al. | 380/25 |
| 6,012,159 | A | 1/2000 | Fischer et al. | 714/755 |
| 6,026,163 | A | 2/2000 | Micali | 380/9 |
| 6,035,041 | A * | 3/2000 | Frankel et al. | 380/30 |
| 6,055,508 | A | 4/2000 | Naor et al. | 705/11 |
| 6,122,742 | A | 9/2000 | Young et al. | 713/201 |
| RE36,918 | E | 10/2000 | Micali | 380/30 |
| 6,134,326 | A | 10/2000 | Micali | 380/30 |
| 6,137,884 | A | 10/2000 | Micali | 380/30 |
| 6,141,750 | A | 10/2000 | Micali | 713/168 |
| 6,182,214 | B1 * | 1/2001 | Hardjono | 713/163 |
| 6,192,472 | B1 | 2/2001 | Garay et al. | 713/165 |
| 6,477,254 | B1 * | 11/2002 | Miyazaki et al. | 380/286 |
| 6,587,946 | B1 * | 7/2003 | Jakobsson | 713/180 |
| 6,701,435 | B1 * | 3/2004 | Numao et al. | 713/168 |
| 7,003,677 | B1 * | 2/2006 | Herzberg et al. | 713/180 |

OTHER PUBLICATIONS

Ford et al, "Server-Assisted Generation of a Strong Secret from a Password," Proceedings of the IEEE 9th International Workshops on Enabling Technologies: Infrastructure for Collaborative Enterprises, NIST, Gaithersburg MD, Jun. 14-16, 2000, pp. 176-180.*

Jablon, "Strong Password-Only Authenticated Key Exchange," Computer Communication Review, ACM SIGCOMM, vol. 26, No. 5, Oct. 1996, pp. 5-26.*

Naor et al, "Efficient Trace and Revoke Schemes," In Proceedings of Financial Cryptography, Feb. 2000, pp. 1-24.*

Pieprzyk et al, "Multiparty key agreement protocols," IEE Proceedings E. Computers & Digital Techniques, Institution of Electrical Engineers, v. 147, n. 4, Jul. 28, 2000, pp. 229-236.*

Shamir, "How to Share a Secret," Communications of the ACM, vol. 22, 1979, pp. 612-613.*

Menezes, et al., "Handbook of Applied Cryptography, Section 12.7", CRC Press Series on Discrete Mathematics and its Applications, pp., 524-527 & 538-540, Copyright 1997.

* cited by examiner

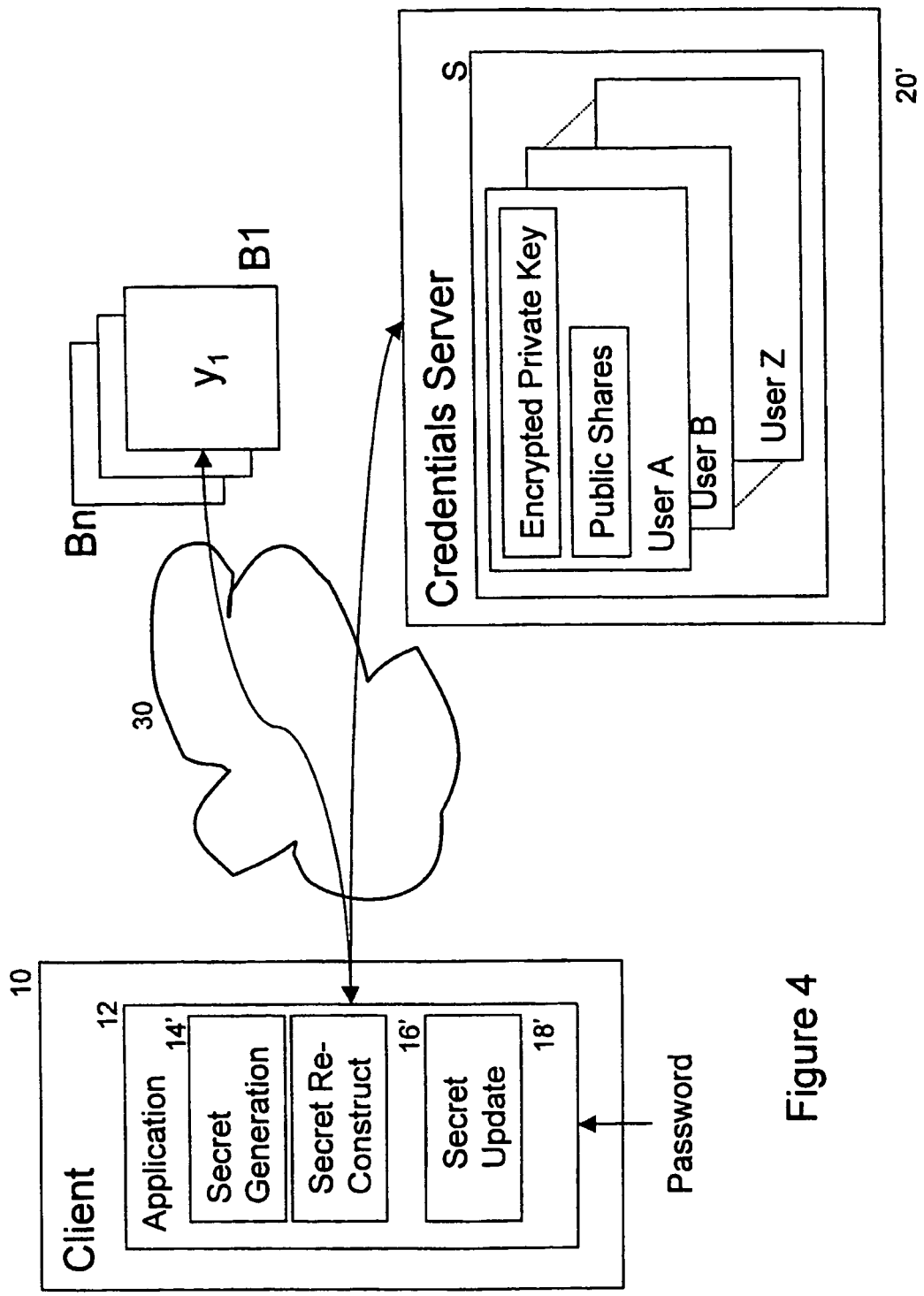

SYSTEM AND METHOD FOR PROCESSING A SHARED SECRET

CROSS REFERENCE TO RELATED APPLICATIONS

The present application is a 371 U.S. national filing of PCT application, Application No. PCT/IE02/00050, filed Apr. 18, 2002, which claims priority from Irish patent application S2001/0423, filed Apr. 27, 2001, which are hereby incorporated by reference herein in their entireties.

FIELD OF THE INVENTION

The present invention relates to a system and method for processing a shared secret. In particular, the invention relates to obtaining a shared secret from a set of arbitrary numbers.

BACKGROUND ART

In "How to Share a Secret", A. Shamir, Communications of the ACM, vol. 22, pp. 612-613, 1979 (Shamir) there is described a method whereby, given two numbers n and m, where m<n, an arbitrary secret can be split into n parts (shares), such that any m of the resulting shares can be combined to recover the original secret. The technique ensures that anyone who has less than m shares is no better off than if they had no shares at all. This technique also allows the sharing of a secret such that any m of n shareholders can reconstruct the secret without revealing their shares.

Referring now to FIG. 1, which illustrates the principles involved in more detail, there is shown a pair of cubic graphs based on the formula:

$$y = ax^3 + bx^2 + cx + d$$

Conventionally, the y value at x=0 is taken to be a secret, and shares in the secret, comprising values from which other y values can be derived, are distributed across n share-holders, in this case n=6, typically servers with which a client computer can connect securely. Using simultaneous equations it will be seen that given any four points, say $(x_1, y_1)$; $(x_2, y_2)$; $(x_3, y_3)$ and $(x_4, y_4)$ on a curve, then any other point on the curve including the secret can be determined—so here m=4.

In, "Server-Assisted Generation of a Strong Secret from a Password", W. Ford and B. Kaliski, Proceedings of the IEEE 9th International Workshops on Enabling Technologies: Infrastructure for Collaborative Enterprises, NIST, Gaithersburg Md., Jun. 14-16, 2000 (Ford-Kaliski) which in turn refines "Strong Password-Only Authenticated Key Exchange", D. Jablon, Computer Communication Review, ACM SIGCOMM, vol. 26, no. 5, pp. 5-26, October 1996 (Jablon) there is disclosed a technique (SPEKE) for securely retrieving a number from, for example, a remote server without revealing a password to the remove server.

So, referring to FIG. 2, using Ford-Kaliski in combination with Shamir, a user running an application 12 on a client machine 10 on which they do not want to store, for example, their private key can store their private key in an encrypted format on a remote credentials storing server 20. The private key is encrypted with a secret number generated from shares comprising arbitrary numbers $y_i$ stored on share-holding servers B1 . . . Bn.

Using Ford-Kaliski, once a secret has been constructed by a secret generation component 14, the user can supply their password to the application on the client machine and a secret re-construction component 16 of the application connects to all n servers and without disclosing the password, securely obtains m shares $y_i$. Points $(x_i)$ on a curve, for example a curve of the type shown in FIG. 1, are calculated from the formula $x_i = g^{yi} \bmod p$, where g is a hash version of the password and p is 1024-bit prime number. From these points, the secret value at x=0 can be determined. The encrypted private key can then be downloaded from the credentials server and decrypted with the secret value, to enable the user of the client to securely communicate with other users or to properly authenticate themselves to other devices on a network 30 such as a LAN, Intranet or Internet. So, for example, the system can be employed by "hot-desking" bank tellers who regularly use different computer terminals in a bank branch and whose access to bank records must be both secure and/or authenticated.

It can be seen from FIG. 1 that in an m-of-n system more shares than are necessary to re-generate a secret can be stored on servers so providing redundancy in the case of a communication failure with up to n-m of the servers. However, in order for a secret update component 18 to change the secret, it must not only be able to re-generate the secrete but also be able to change the values of all shares of the secret.

Many patents reference Shamir, and largely fall into one of a number of categories:

Patents which reference Shamir's paper, but do not make use of secret sharing techniques:
U.S. Pat. No. 5,553,145; U.S. Pat. No. 5,629,982; U.S. Pat. No. 5,666,420; U.S. Pat. No. 6,134,326; U.S. Pat. No. 6,137,884; and U.S. Pat. No. 6,141,750: Simultaneous electronic transactions with subscriber verification;
U.S. Pat. No. 5,812,670: Traceable anonymous transactions; and
U.S. Pat. No. 6,055,508: Method for secure accounting and auditing on a communications network.

Patents which disclose secret sharing for fault-tolerant transmission:
U.S. Pat. No. 5,485,474: Scheme for information dispersal and reconstruction; and
U.S. Pat. No. 6,012,159: Method and system for error-free data transfer.

Patents which disclose secret-sharing techniques, where the secret is not updated, as in:
U.S. Pat. No. 5,315,658; U.S. RE036,918: Fair cryptosystems and methods of use;
U.S. Pat. No. 5,495,532: Secure electronic voting using partially compatible homomorphisms;
U.S. Pat. No. 5,666,414: Guaranteed partial key-escrow;
U.S. Pat. No. 5,708,714: Method for sharing secret information and performing certification in a communication system that has a plurality of information processing apparatus;
U.S. Pat. No. 5,768,388: Time delayed key escrow;
U.S. Pat. No. 5,825,880: Multi-step digital signature method and system;
U.S. Pat. No. 5,903,649: Method for establishing a common code for authorized persons through a central office;
U.S. Pat. No. 5,991,414: Method and apparatus for the secure distributed storage and retrieval of information;
U.S. Pat. No. 6,192,472: Method and apparatus for the secure distributed storage and retrieval of information; and
U.S. Pat. No. 6,026,163: Distributed split-key cryptosystem and applications.

Miscellaneous patents, such as:
U.S. Pat. No. 5,764,767: System for reconstruction of a secret shared by a plurality of participants, which provides a mechanism for updating a shared secret, however, all the locations where the secrets are stored are active participants in updating the secret;

U.S. Pat. No. 5,867,578: Adaptive multi-step digital signature system and method of operation thereof, where the shares change but the value of the shared secret is maintained; and U.S. Pat. No. 6,122,742: Auto-recoverable and auto-certifiable cryptosystem with unescrowed signing keys, which uses a shared function, not a shared secret.

Pieprzyk discloses a method of constructing shares in a secret k comprising the steps of: determining n shares for an n-of-n secret sharing scheme, each share comprising a value y; storing at least some of said shares in computing devices such that at least m of said n shares are reliably accessible; and determining the shared secret k according to said shares y.

It will be seen, however, that none of these documents discloses being able to update a shared secret without having access to all the shareholders of the secret. This becomes an important requirement when clients such as that shown in FIG. 2 are accessing shareholder servers across unreliable links such as network links or communication links or links through which bandwidth may need to be regulated by, for example, a load-balancing server (not shown) which may prevent or unduly delay a client's access to a shareholder server.

DISCLOSURE OF THE INVENTION

According to a first aspect of the present invention there is provided, a method characterised by m being less than n and by the steps of: determining a further (n-m) shares consistent with the shared secret k and the shares y; and storing the additional shares in a reliably accessible location.

According to a second aspect of the invention, there is provided in a network comprising a number of computing devices, each arranged to securely store at least one share in a secret k for which n shares are required to reconstruct the secret and to which access to a number m of said shares can be reliably provided at any given time, a method of reconstructing said secret comprising the steps of: securely obtaining m shares from one or more secret share holders including at least one of said computing devices; characterised by m being less than n and by the steps of: obtaining (n-m) shares from a reliably accessible location; and constructing the shared secret k according to said obtained shares.

There is further provided a method of updating the secret employing the second aspect of the invention.

Further aspects of the invention are embodied as respective apparatus and computer program products for generating and constructing and updating a shared secret.

In contrast with the prior art where clearly it is considered essential that none of the shares of a secret is public, the present invention uses additional public shares to implement the invention.

In the present invention some of the shareholder storage locations need not be aware that an update to a shared secret is occurring. The invention therefore allows the following two operations:

given any n arbitrary numbers, a shared secret k can be constructed and reconstructed using any m of those numbers, with the help of public data stored on a data storage device; and the shared secret can be changed without having to access all of the stored shares.

The invention is particularly useful because it is not necessarily the case that n random numbers will form a consistent m-from-n set of shares. However, there may be cases (as will be explained below) where an entity has access to several separate, long-lived and random values and cannot guarantee that it will have access to all of them at any one time. In this case, this invention allows the entity to combine the values from different locations in such a way that if the entity doesn't contact them all, it doesn't matter; and if an attacker is able to intercept the values from any number less than m of the locations, that attacker will be unable to reconstruct the secret from the intercepted values.

Various embodiments of the invention will now be described by way of example with reference to the accompanying drawings in which:

FIG. 4 illustrates a network across which shares of a shared secret can be accessed and updated according to the invention.

DESCRIPTION OF THE PREFERRED EMBODIMENTS

Figure 1:
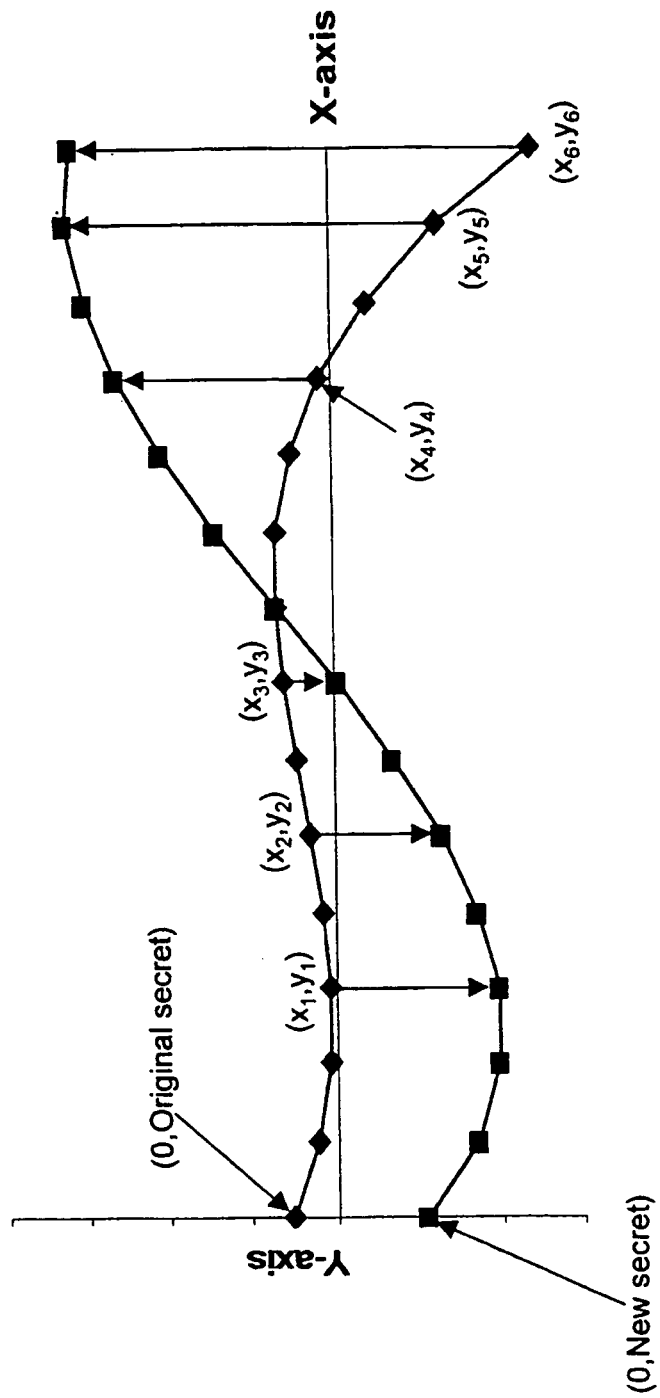
FIG. 1 illustrates prior art functions based on secret shares to determine a secret.
Figure 2:
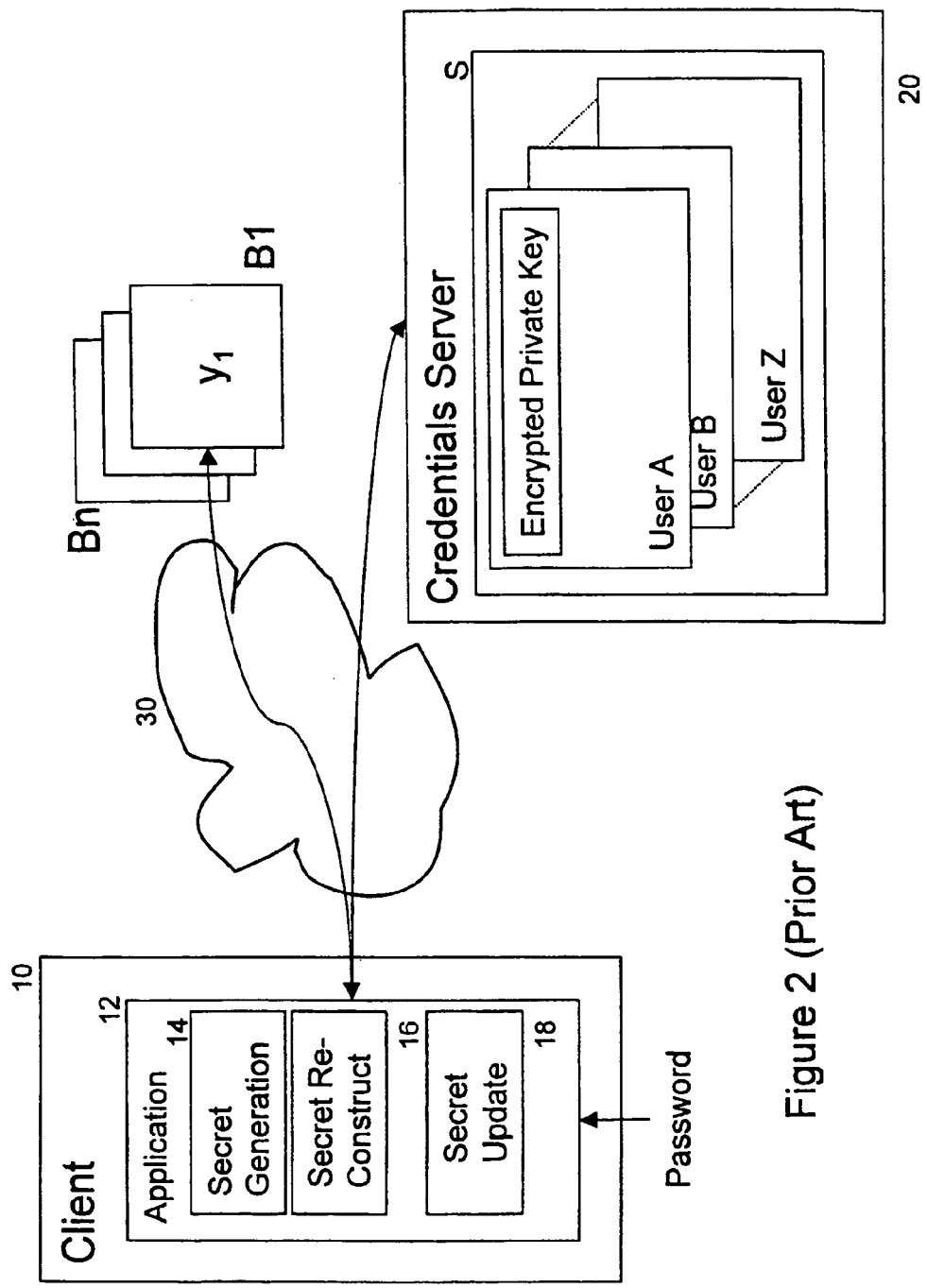
FIG. 2 illustrates a prior art network across which shares of a shared secret can be accessed and updated.
Figure 3:
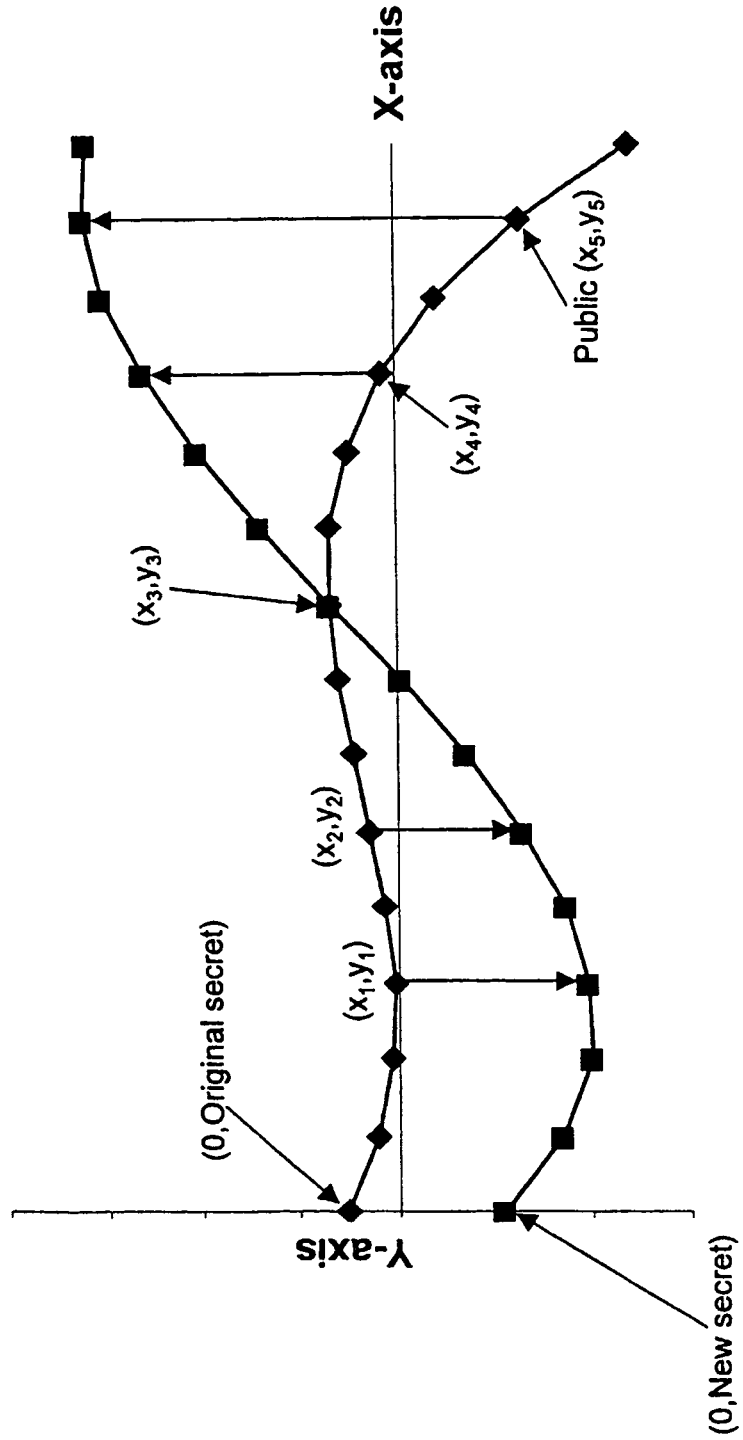
FIG. 3 illustrates functions based on secret shares and one public share to determine and update a secret according to the invention.

The principle of operation of the invention is explained in relation to FIG. 3. If points $(x_1,y_1)$; $(x_2,y_2)$; $(x_3,y_3)$ and $(x_4,y_4)$ correspond with four shares of a 4-from-4 secret sharing scheme, but it is decided that communication can only be established reliably with say 3 of the 4 shareholders, then a fifth public share $(x_5,y_5)$ is generated and stored at a reliably accessible location, for example, in the credentials server 20', FIG. 4. The scheme now becomes a 4-from-5 scheme, where one of the shares is public. Thus, any three of the secret shares can be combined with the public share, to re-generate the secret (0, Original secret).

To update the secret, again any three of the secret shares obtained (in this case $(x_1,y_1)$; $(x_2,y_2)$; and $(x_4,y_4)$) along with the public share $(x_5,y_5)$ are used to determine the secret. The secret is then changed to (0, New secret) and each of the three secret share values as well as the public share $(x_5,y_5)$ value are updated, but leaving the share value of any unobtained shares, in this case $(x_3,y_3)$, unchanged.

Extending the principle further, if it is decided that communication can only be established reliably with say 2 of the four shareholders, then two public shares are generated and stored at the credentials server 20'. The scheme now becomes a 4-from-6 scheme, where two of the shares are public. Thus, any two of the secret shares can be combined with the public shares to re-generate the secret.

It will, therefore, be seen that in an m-from-n secret sharing scheme, for each share (n-m) on which the client does not wish to rely to re-generate or update the secret, an additional public share is generated, thereby giving an n-from-(2n-m) scheme where n-m of the shares are public.

While the above examples appear to lessen the level of security by reducing the number of secret shares required from a starting point with a given number of servers, it will be seen that any level of security and redundancy can be employed using the invention. Thus, for any required level of security, that is secret shares required m, and redundancy, that is total servers less required shares (n-m), then using the invention (n-m) additional shares are employed within a conventional n-from-(2n-m) scheme.

Referring now to FIG. 4 which illustrates an exemplary implementation of the invention, an application 12 running on the client 10 has secure but unreliable communications with n data storage devices, for example, the share holding servers B1 . . . Bn, and an insecure but reliable connection to another data storage device S, for example, on the credentials server 20'. Each of the data storage devices Bi returns to the client random value yi.

To get a secret, which can be reconstructed given only m of the yi, a secret generation component 14' of the application 12, does the following:
1. obtains (possibly by generating them) all of the yi;
2. treats the yi as shares in an n-of-n scheme, and reconstructs the shared secret k given by them;
3. generates a further (n-m) shares consistent with k and the yi; and
4. stores these additional shares on the reliable data storage device S.

To reconstruct the secret in subsequent sessions, the secret re-construction component 16' does the following:
1. obtains the (n-m) shares from the reliable data storage device S; and
2. contacts m of the data storage devices Bi and retrieves a respective yi from each.

Since the client now has n of the shares, the secret generation component 16' can now reconstruct the secret k and so the client application 12 or other client applications can use the secret to, for example, decrypt the encrypted private key for the user of the client machine.

The above technique can be used to update the secret even in the case where not all the data storage devices Bi are online. In the update procedure, a secret update component 18' does the following:
1. obtains the (n-m) shares from the reliable data storage device S;
2. contacts m of the data storage devices Bi and retrieves a respective yi from each;
3. reconstructs the secret k; and also deduces from the retrieved shares yi the values of the shares for those data storage devices that did not respond;
4. in general, engages in a process such that at the end some data storage devices are known to have new shares yi' associated with them and some are known to only have the old shares yi, for example, by
   generating any number less than n of new shares yi' and transmitting each new share yi' securely to the appropriate data storage device Bi, requesting confirmation that they have been received; or
   requesting each data storage device to generate and return a new share yi';
5. generates a new shared secret k' using the following shares:
   for each Bi which didn't get a new share yi' generated for it, or which is known not to have received the yi' it was sent, or which didn't generate a new share yi', use the old share yi;
   for each other Bi, use the new share yi'. This gives a shared secret that is consistent with the shares known by each of the Bi;
6. generates a further (n-m) shares which are consistent with the yi' and yi used; and
7. stores these additional shares on the reliable data storage device S.

In a more detailed example, the secret sharing scheme is based on Shamir's scheme which uses Lagrange polynomial interpolation over the group $Z^*p$, where P is a 1024-bit prime number and the random numbers are obtained using a refinement of the Ford-Kaliski scheme which, in turn, refines Jablon's SPEKE technique.

The system is based on two primes: p, a large (typically 1024-bit) prime with respect to which we perform modular exponentiation; and r, which is the smallest prime that is 160 bits long.

To generate share-holder servers' shares, the secret generation component 14' generates a number $g<p$ from the user provided password. For each server Bi, the component 14':
 picks a random wi, 160 bits long.
 calculates $g^{wi} \bmod p$; and
 truncates the result to be 159 bits long. The result is yi, to be stored on the servers Bi.

Note that all the yi will be less than r and that the client now has n shares yi, i=1 to n. There is one polynomial f( ) of degree (m−1) over the integers mod r, which passes through the n points (i, yi).

To generate the additional shares, the secret generation component 14':
 calculates the n coefficients of the polynomial, f( );
 calculates the value of f(0). This is the shared secret; and
 calculates the value of f(i), for i=n+1 to 2n-m. These are the additional shares. They can all be stored as 160-bit numbers.

To recombine the shares, the secret re-construction component 16':
 retrieves yi from m of the Bi—this is done by the method outlined in Ford-Kaliski;
 retrieves the additional shares numbered n+1 to 2n-m from the additional server S. This gives the client n shares in total. There is one polynomial of degree (n−1) over the integers mod r, which passes through the n points (i, yi); and
 calculates the n coefficients of this polynomial, f( ), and then calculates f(0). This is the shared secret.

Once the secret has been re-constructed it can be updated as outlined previously.

While the preferred embodiments described above are illustrative of the invention, it will be seen that many variations of the invention are possible.

For example, it is not necessary that the additional public shares are stored on the server 20' remote from the client 10, only that the additional shares are reliably accessible when the secret is to be updated. So, for example, the additional shares may be stored in any computer readable medium such as a floppy disk, smart card etc.

It will also be seen that the components 14', 16', 18' incorporating the invention need not all be included in the same application. Specifically, the secret generation and updated components may run in applications or even computers independently of the stand alone secret re-construction component.

Similarly, it will be seen that not all secret shares need to be stored on remote servers only that at least m of the n shares are reliably accessible when the secret is to be re-constructed or updated. So, for example, the secret shares may be stored in any computer readable medium such as a floppy disk, smart card etc.

It will also be seen that the invention is not strictly limited to the use of either the Shamir secret sharing technique or the Ford-Kaliski technique for securely obtaining secret shares. So, for example, it is not strictly necessary that the share values are used to construct a polynomial of the type employed to illustrate the operation of the invention.

Finally, it will be seen that the claims are not strictly limited to the order of the steps or features recited and that where possible the invention can be implemented in any order or even with steps being performed in parallel.

The invention claimed is:
1. In a network comprising a number of computing devices, each arranged to securely store at least one share in a secret k for which n shares are required to reconstruct the secret and to which access to a number m of said shares can be reliably provided at any given time, a method of constructing shares in a secret comprising:

determining n shares for an n-of-n secret sharing scheme, each share comprising a value y;

storing at least some of said shares in said computing devices such that at least m of said n shares are reliably accessible, wherein m is less than n; and determining the shared secret k including:

determining that (n-m) shares of said n shares will be unreliably accessible;

generating (n-m) public shares consistent with the shared secret k and the shares value y, wherein each of the (n-m) public shares represents one of the unreliably accessible shares;

storing the (n-m) public shares in a reliably accessible location; and combining any set of m of said n shares with said (n-m) public shares to regenerate the secret k.

2. In a network comprising a number of computing devices, each arranged to securely store at least one share in a secret k for which n shares are required to reconstruct the secret and to which access to a number m of said shares can be reliably provided at any given time, a method of reconstructing said secret comprising:

securely obtaining m shares from one or more secret share holders including at least one of said computing devices, wherein m is less than n;

obtaining (n-m) public shares that are consistent with the secret k and the shares value y from a reliably accessible location, wherein each of the (n-m) public shares represents an unreliably accessible share; and constructing the shared secret k according to said m shares and said (n-m) public shares.

3. In a network comprising a number of computing devices, each arranged to securely store at least one share in a secret k for which n shares are held by n number of secret share holders and required to reconstruct the secret and to which access to a number m of said shares can be reliably provided at any given time, a method of updating said secret comprising:

reconstructing said secret k according to the steps of:

securely obtaining m shares from one or more secret share holders including at least one of said computing devices, wherein m is less than n;

obtaining (n-m) public shares that are consistent with the secret k and the shares value y from a reliably accessible location, wherein each of the (n-m) public shares represents an unreliably accessible share and wherein the (n-m) public shares are not included in the n shares held by the n number of secret share holders; and constructing the shared secret k according to said m shares and said (n-m) public shares;

deducing from the obtained shares the values of the shares for the unobtained n-m shares of the secret, each of the unobtained n-m shares being associated with one of the unreliably accessible shares;

determining for each location from which a share was securely obtained a new share value y';

determining a new shared secret k' according the new share values y' and the unobtained share values;

storing at least some of said new shares in said computing devices such that at least m of said new shares and said unobtained shares are reliably accessible;

generating additional (n-m) public shares which are consistent with the new share values and the unobtained share values; and storing the additional (n-m) public shares in a reliably accessible location.

4. A method according to claim 3 wherein said step of determining for each location from which a share was securely obtained a new share value y' comprises:

generating said new shares value y' and transmitting at least one new share value y' securely to one of the computing devices; and requesting confirmation that they have been received.

5. A method according to claim 3 wherein said step of determining for each location from which a share was securely obtained a new share value y' comprises:

requesting each location from which a share was securely obtained to generate and securely return a new share value y'.

6. Apparatus for constructing shares in a secret and operable within a network comprising a number of computing devices, each arranged to securely store at least one share in a secret k for which n shares are required to reconstruct the secret and to which access to a number m of said shares can be reliably provided at any given time, comprising:

a client device configured to:

determine n shares for an n-of-n secret sharing scheme, each share comprising a value y;

cause at least some of said shares to be stored in said computing devices such that at least m of said n shares are reliably accessible, wherein m is less than n; and determine the shared secret k including:

determining that (n-m) shares of said n shares will be unreliably accessible;

generating (n-m) public shares consistent with the shared secret k and the shares value y, wherein each of the (n-m) public shares represents an unreliably accessible share;

causing the (n-m) public shares to be stored in a reliably accessible location; and combining any set of m of said n shares with said (n-m) public shares to regenerate the secret k.

7. Apparatus for reconstructing a secret and operable in a network comprising a number of computing devices, each arranged to securely store at least one share in a secret k for which n shares are required to reconstruct the secret and to which access to a number m of said shares can be reliably provided at any given time, comprising:

a client device configured to:

securely obtain m shares from one or more secret share holders including at least one of said computing devices, wherein m is less than n;

obtain (n-m) public shares that are consistent with the secret k from a reliably accessible location, wherein each of the (n-m) public shares represents an unreliably accessible share; and construct the shared secret k according to said m shares and said (n-m) public shares.

8. A non-transitory computer readable medium that includes computer readable instructions that can cause a computer to construct a secret by:

determining n shares for an n-of-n secret sharing scheme, each share comprising a value y;

storing at least some of said shares in said computing devices such that at least m of said n shares are reliably accessible, wherein m is less than n;

determining the shared secret k including:

determining that (n-m) shares of said n shares will be unreliably accessible;

generating (n-m) public shares consistent with the shared secret k and the shares value y, wherein each of the (n-m) public shares represents the unreliably accessible share;

storing the further shares in a reliably accessible location; and combining any set of m of said n shares with said (n-m) public shares to regenerate the secret k.

9. A non-transitory computer readable medium that includes computer readable instructions that can cause a computer to re-construct a secret by:

securely obtaining m shares from one or more secret share holders including at least one of said computing devices, wherein m is less than n;

obtaining (n-m) public shares that are consistent with the secret k and the shares value y from a reliably accessible location, wherein each of the (n-m) public shares represents an unreliably accessible share; and constructing the shared secret k according to said m shares and said (n-m) public shares.

10. A method as claimed in claim 1 wherein the step of determining n shares comprises:

determining n arbitrary numbers w, said values y being calculated from said numbers w.

* * * * *